United States Patent [19]

Sato

[11] 4,187,857
[45] Feb. 12, 1980

[54] ULTRASONIC WAVE DIAGNOSTIC APPARATUS TO CONCURRENTLY DISPLAY AN ECHO SIGNAL AND A REFERENCE SIGNAL

[75] Inventor: Shigeru Sato, Yamato, Japan

[73] Assignee: Tokyo Shibaura Electric Co., Ltd., Kawasaki, Japan

[21] Appl. No.: 855,808

[22] Filed: Nov. 29, 1977

[30] Foreign Application Priority Data

Nov. 29, 1976 [JP] Japan .................. 51-143142

[51] Int. Cl.$^2$ .............................. A61B 10/00
[52] U.S. Cl. .................. 128/660; 73/609
[58] Field of Search .......... 128/2 V, 2.05 Z; 73/606, 609, 611, 618, 620

[56] References Cited

U.S. PATENT DOCUMENTS

| | | | |
|---|---|---|---|
| 3,624,744 | 11/1971 | Munger | 128/2 V |
| 3,744,479 | 7/1973 | Stein et al. | 128/2 V |
| 3,902,476 | 9/1975 | Hileman | 128/2 V |
| 3,972,228 | 8/1976 | Mansson | 73/609 |
| 4,043,321 | 8/1977 | Soldner et al. | 128/2 V |
| 4,052,977 | 10/1977 | Kay | 128/2 V |

OTHER PUBLICATIONS

Kossoff et al., "Medical and Biological Engineering," vol. 5, 25–32, 1967.
Uchida et al., "Bulletin of the Japan Ultrasonic Medical Society," 1974, 25-60.
Sato et al., "Bulletin of the Japan Ultrasonic Medical Society," 1974, 25-61.

Primary Examiner—William E. Kamm
Attorney, Agent, or Firm—Finnegan, Henderson, Farabow & Garrett

[57] ABSTRACT

A signal, which is the sum of an ultrasonic wave echo signal and a group of PPM (pulse-position-modulated) pulses representative of a reference signal, is applied to a cathode ray tube (CRT) and is swept along one axis by a first sweeping signal with a first frequency and along a second axis by a second sweeping signal of lower frequency. The ultrasonic echo signal and the group of PPM pulses are concurrently displayed on the CRT. Ultrasonic wave rate pulses synchronous with the first sweeping signal are applied at the first frequency to an ultrasonic transducer to emit ultrasonic waves which upon receipt are converted to an ultrasonic wave echo signal. A sawtooth wave generator circuit is provided for generating a sawtooth wave with a second frequency n times the first frequency. Here, n is an integer and equal to or larger than 2. The reference signal, such as an electrocardiographic signal, is modulated by the sawtooth wave to produce a train of pulse-position-modulated (PPM) pulses. Electronic circuitry rearranges the PPM pulses produced during a period of the rate pulse to fit within the period of a selected sawtooth wave included in the rate pulse period. The ultrasonic wave echo signal and the PPM pulses representing samples of the reference signal are added and displayed on a cathode ray table to form an M-mode image and a representation of the reference image. For every display of the ultrasonic wave echo signal corresponding to an ultrasonic wave pulse displayed, n PPM pulses representing the reference signal are displayed.

12 Claims, 7 Drawing Figures

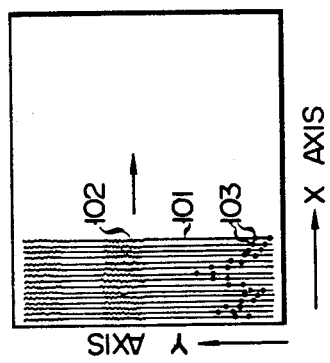
F I G. 6
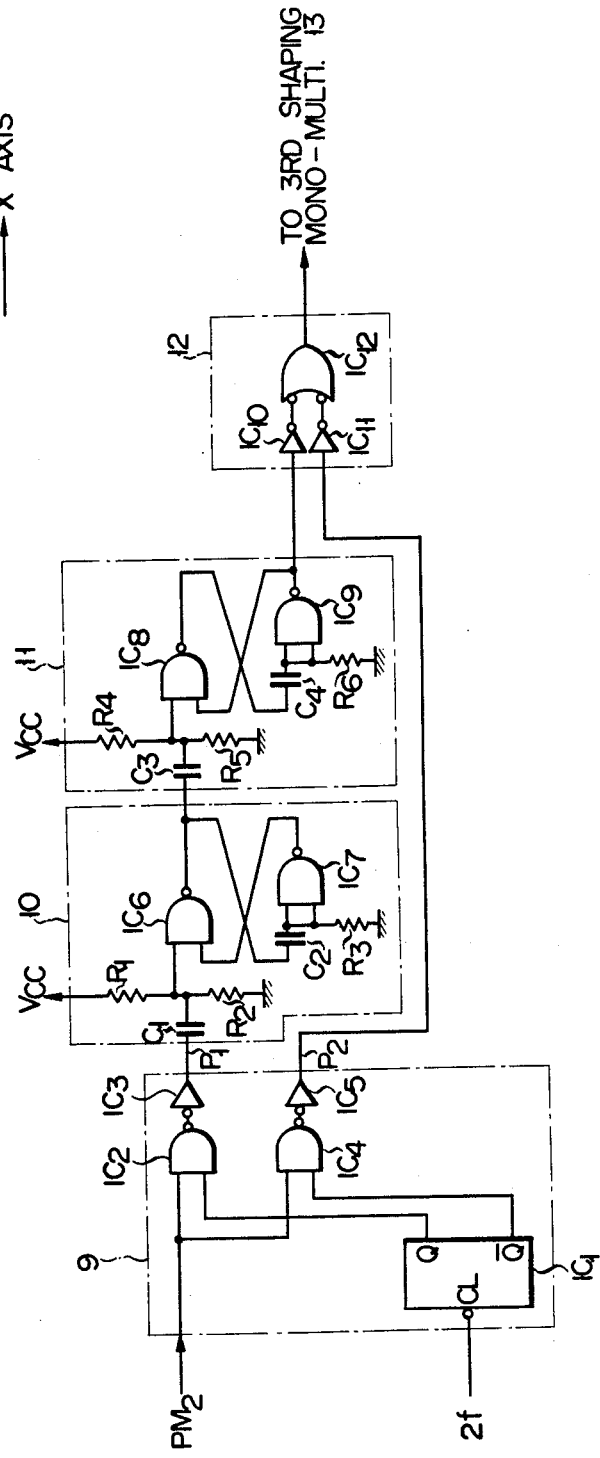
F I G. 7

4,187,857

ULTRASONIC WAVE DIAGNOSTIC APPARATUS TO CONCURRENTLY DISPLAY AN ECHO SIGNAL AND A REFERENCE SIGNAL

BACKGROUND OF THE INVENTION

The present invention relates to an ultrasonic wave diagnostic apparatus for concurrently display an ultrasonic wave echo signal and a reference signal on a display apparatus such as a cathode ray tube.

A system for concurrently displaying an ultrasonic wave echo signal and a reference signal, for example, an electrocardiogram, on an identical CRT (cathode ray tube) is known as an M-mode display system. A PPM (pulse-position-modulation) method is known for displaying the reference signal on the CRT. In this method, the reference signal is pulse-position-modulated by a sawtooth wave, for example, to produce PPM (pulse-position-modulated) pulses which represent portions of the reference signal. The PPM pulses and an ultrasonic echo signal representing echo pulses are added and applied, as added, to the CRT as a signal to be modulated in intensity.

In the conventional systems, apparatus generates one sawtooth wave for the reference signal during the period of each rate pulse. Accordingly, if it is desired to shorten the sampling period of the reference signal and therefore obtain increased sensitivity, the frequency of the rate pulses must be increased. However, if the rate pulse frequency is increased, the diagnostic depth must be shallowed. Here, the diagnostic depth means the distance from the position of the ultrasonic wave transducer to an object to be diagnosed. Thus, if the frequency of the rate pulses is decreased in order to make the diagnostic depth deep, the sampling period of the reference signal is lengthened, making the accurate display of the reference signal on the CRT impossible.

A one conventional method utilized to overcome that disadvantage has been to display the reference signal with high frequencies such as a phonocardiogram, separately from the M-mode signal (the detected echo signals which vary with time to represent the movement of a part of the object being diagnosed). In such applications, a CRT of dual beam type is used. This conventional method, however, is impractical because of expensiveness of the CRT used.

When the echo signal reflected from the diagnostic object is sweeped in Y direction on the CRT to form a M-mode image, the sweeping rate of the CRT in the X direction is very slow, i.e. 1 to 10 seconds per one frame, and thus the intervals of the reference signal in the X direction are short. Therefore, the display of the reference signal in the X direction is not decisively important. Accordingly, improvement of only the Y directional sweeping, or the sweeping of the ultrasonic echo signal, suffices for practical needs.

Accordingly, an object of the present invention is to provide an ultrasonic wave diagnostic apparatus in which the display characteristic of the reference signal in the sweeping direction of the ultrasonic echo signal is improved by sampling a plurality of times the reference signal during the period of the rate pulses.

SUMMARY OF THE INVENTION

According to the present invention, there is provided an ultrasonic wave diagnostic apparatus comprising: display means for concurrently displaying an ultrasonic wave echo signal and a reference signal; means for generating rate pulses with a first frequency to determine the generating rate of ultrasonic pulses; means for supplying the rate pulses to an ultrasonic transducer; means for displaying the ultrasonic wave echo signal produced in response to the rate pulses on the display means; a sawtooth wave generating circuit for generating sawtooth waves with a second frequency n times ($n \geq 2$) the first frequency so that n number of sawtooth waves are included in one period of the rate pulse; means for modulating the reference signal by the sawtooth waves with the second frequency and for producing pulse-position-modulated (PPM) pulses; means for producing a PPM signal for displaying the reference signal by which means n PPM pulses included in one period of the rate pulse are rearranged to fit within the period of a selected one of the n sawtooth waves; and means for concurrently displaying the ultrasonic wave echo signal PPM signal for displaying the reference signal.

According to the ultrasonic wave diagnostic apparatus according to the present invention, n sawtooth waves for sampling the reference signal are produced during one period of the rate pulses for ultrasonic wave generation. Therefore, the reference signal is sampled n times during the one period and the resultant n PPM pulses are included in the display representing one period of the rate pulse. These n PPM pulses are positioned in the period of a selected one of the n sawtooth waves and then converted into a signal for displaying the reference signal. The echo signal and the signal for displaying the reference signal are concurrently displayed on each scanning line for scanning the echo signal. Therefore, display of the reference signal is improved in sensitivity as compared to the conventional apparatus of this kind. By selecting the pulse width of the rate pulse, the diagnostic depth may be properly selected without unduly lengthening the sampling period of the reference signal.

Other objects and features of the present invention will be apparent from the following description taken in connection with the accompanying drawings, in which:

BRIEF DESCRIPTION OF THE DRAWINGS

FIG. 6 shows one form of display states on CRT of FIG. 4; and

FIG. 7 shows a circuit diagram of a circuit for obtaining a signal for displaying a reference signal.

DETAILED DESCRIPTION OF THE PREFERRED EMBODIMENT

To facilitate the understanding of the invention, an explanation of one of the prior art apparatus will be given with reference to FIGS. 1 to 3. A reference signal RS, for example, an electrocardiogram (see FIG. 2, line A), and a sawtooth wave sweeping signal SS (see FIG. 2, line B) with the same period as that of the rate pulses (not shown) determining the supersonic wave generating rate, are applied to a comparator 1. In the comparator 1, the signals RS and SS are compared to produce $PW_1$ signal (FIG. 2, line C) comprising PWM (pulse-width-modulated) pulses of which the leading edge, i.e. rise position, changes in accordance with the amplitude of the reference signal RS. The $PW_1$ signal is applied to a monostable multivibrator (often referred to simply as a monomulti) which in turn produces a $PM_1$ signal comprising PPM pulses each of which has a sufficiently narrow pulse width and coincides with the leading edge of each pulse of the $PW_1$ signal, see FIG. 2, line D. The ultrasonic rate pulses are applied to an ultrasonic wave generator (not shown). The ultrasonic wave echo signal ES and the signal $PM_1$ are added by an adder 3, and the added signal $ZS_1$ (FIG. 2, line E) is applied to the CRT 4 as a signal Z. The echo signal ES is generated when ultrasonic pulses emitted from an ultrasonic wave generator (not shown) are projected into an object (for example, a human body), received and converted into electrical signals. The signal SS is applied as a Y sweeping signal to the CRT 4, and a low frequency sweeping signal LS fed from a low frequency sweeping signal generating circuit 5 is applied as an X sweeping signal to the CRT 4. Accordingly, the ultrasonic wave echo signal ES and the signal $PM_1$ are simultaneously displayed on the CRT.

Figure 1:
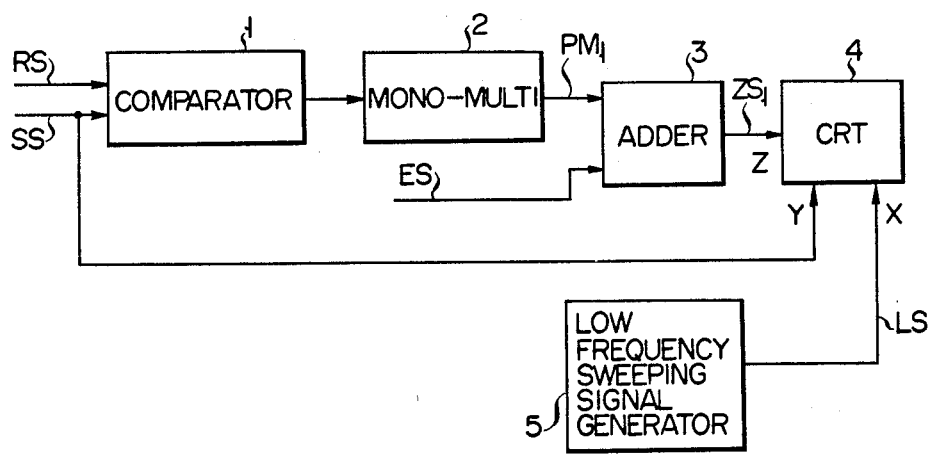
FIG. 1 shows a block diagram of a conventional ultrasonic wave diagnostic apparatus.

In the circuit shown in FIG. 1, the sampling frequency of the reference signal RS is the same as that of the sweeping signal SS, i.e. the rate pulses for ultrasonic wave generation. The propagation rate of the ultrasonic wave in a living body is approximately 1,500 m/s and is almost constant. For this circuit, a sweeping signal SS having the same frequency as that of the ultrasonic wave rate pulses must be restricted below several KHz to achieve the proper diagnostic depth. When the signal SS of several KHz or less is used to sample a reference signal such as a phonocardiogram which includes high frequency components, the sampling points are small in number, and therefore use of the above-mentioned PPM sampling method can not accurately display the phonocardiogram with high frequency components.

Efforts have been made to display the reference signal with high frequencies on the CRT as accurately as possible. One proposal has been to insert two PPM pulses $PM_1$ between adjacent echo pulses ES, as shown in FIG. 3, line A. In other words, one echo signal ES and two PPM pulses $PM_1$, corresponding to two rate pulses RP, are inserted to form the Z signal. The sawtooth wave for sampling shown in FIG. 3, line B, shows that the reference signal is sampled each period of the sawtooth wave. In this case, the period of the sweeping signal for sampling the reference signal is double that of the echo signal ES. The echo signal ES is displayed only every other rate pulse RP. Therefore, the display time of the echo signal ES is half the entire display time.

The present invention increases the accuracy of the display of the reference signal without decreasing the accuracy of the display of the echo signal. The description of the preferred embodiment, illustrated by FIGS. 4–7, follows.

Figure 2:
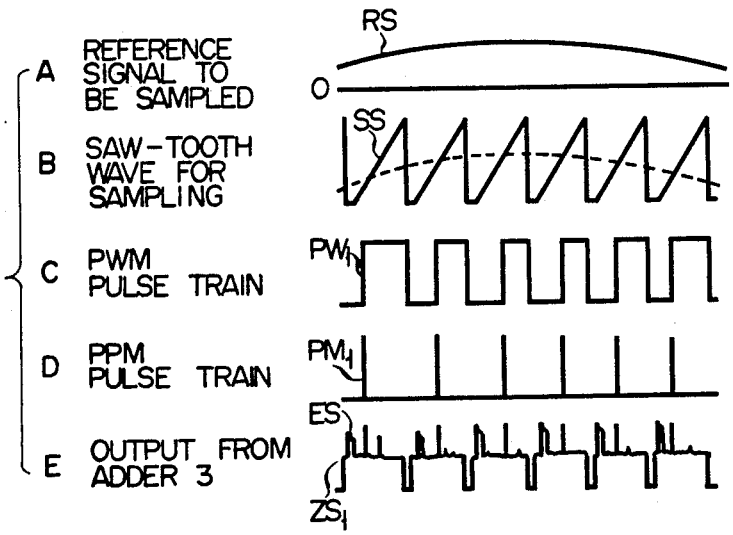
FIG. 2 shows wave forms at the respective portions of the circuit shown in FIG. 1.
Figure 3:
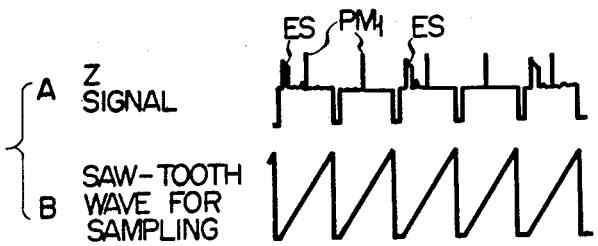
FIG. 3 shows wave forms of some parts of another conventional ultrasonic diagnostic apparatus.
Figure 4:
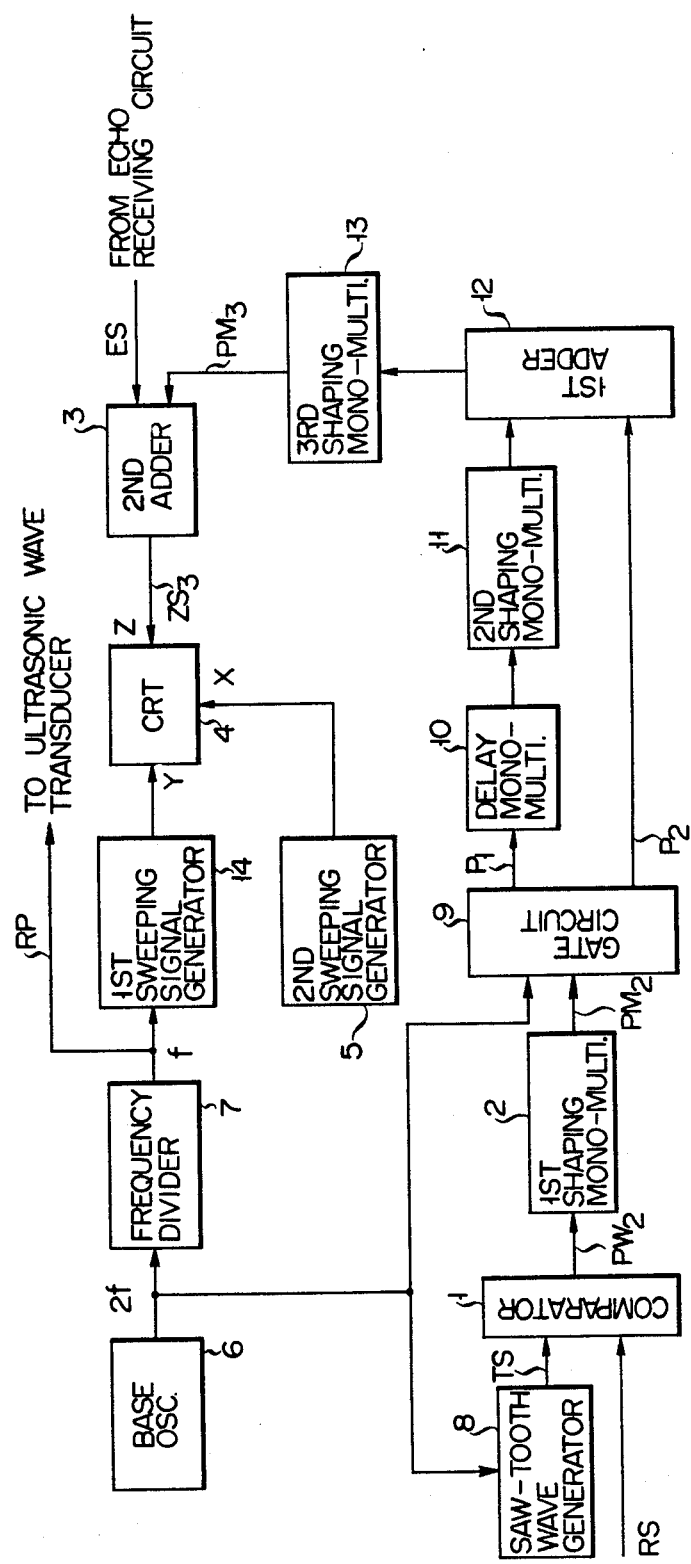
FIG. 4 shows a block diagram of an embodiment of a ultrasonic wave diagnostic apparatus according to the invention.
Figure 5:
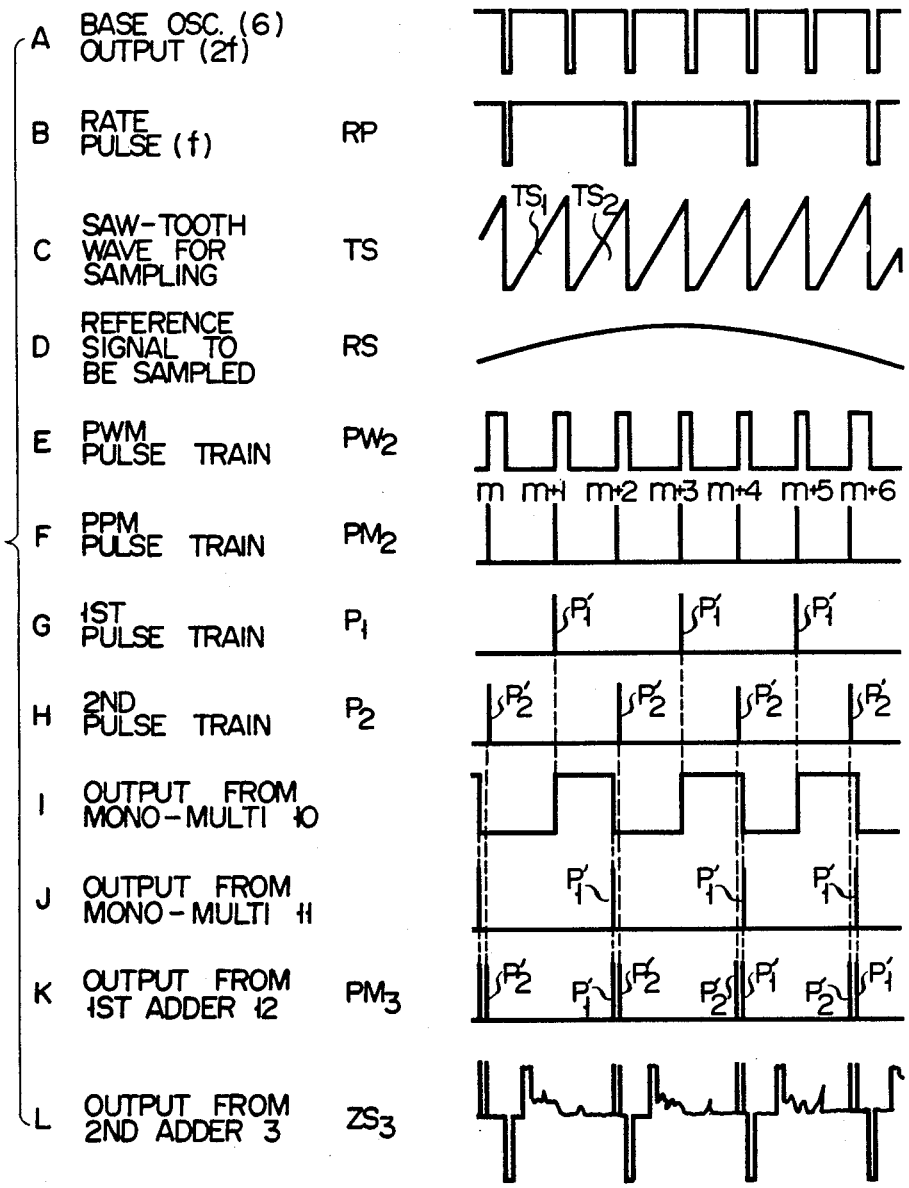
FIG. 5 is a set of wave forms at the respective portions of the FIG. 4 circuit.

Like symbols are used in FIGS. 4 to 6 to designate like or equivalent portions in FIGS. 1 to 3. In FIG. 4, an output signal with a first frequency 2f, for example, fed from a fundamental wave oscillator 6, is supplied to a ½ frequency divider 7 comprising binary counters, for example. The output signal of the oscillator 6 also is applied to a sawtooth wave generator 8 for generating a sawtooth wave with the first frequency 2f, synchronous with the output signal of the oscillator 6, and to a gate circuit 9 to be described later. An output signal TS of the sawtooth wave generator 8 and a reference signal RS are both applied to a comparator 1. A $PW_2$ signal including PWM (pulse-width-modulation) pulses outputted from the comparator 1 is applied to a first monostable multivibrator circuit 2 for wave shaping. The monostable multivibrator 2 produces a signal $PM_2$ including PPM pulses produced through the wave shaping which in turn are applied to the gate circuit 9. The gate circuit 9 produces a first pulse train $P_1$ and a second pulse train $P_2$. The first pulse train $P_1$ includes PPM pulses sampled every other pulse from the PPM pulse train included in the signal $PM_2$ and the second pulse train $P_2$ includes remaining PPM pulses. A monostable multivibrator circuit 10 for delay generates a rectangular wave signal which rises at the input point of the PPM pulse in the first pulse train $P_1$ and has a pulse width corresponding to one period of the output signal of the fundamental oscillator 6. A second monostable multivibrator 11 for wave shaping generates a pulse with sufficiently narrow pulse width at the fall time of the rectangular wave. The output signal of the second monostable multivibrator 11 and the second pulse train $P_2$ are applied to a first adder 12. A pulse train resulting from the addition at first adder 12 is wave-shaped in a third wave shaping monostable multivibrator 13 which produces an output signal $PM_3$ to be directed to one of the inputs of a second adder 3. An output signal with a second frequency f from the frequency dividing counter 7 is fed to a first sweeping signal generator 14. The output signal designated by RP of the frequency divider 7 is applied as the rate pulses for determining the ultrasonic wave generating rate of an ultrasonic wave transducer (not shown). An echo signal ES is applied to the other input of the second adder 3. The echo signal ES is produced from an echo receiving circuit (not shown) which detects ultrasonic wave echos reflected from the diagnostic object when it is irradiated by ultrasonic wave pulses from the ultrasonic wave transducer and converts the received echos into an electrical signal. A second sweeping signal generator (low frequency) 5 is included. The output of the first sweeping signal generator 14 is applied as a Y sweeping signal to the CRT; the output of the second sweeping signal generator 5 as an X sweeping signal to the CRT; the output $ZS_3$ of the second adder 3 as a signal Z to the CRT.

The operation of the apparatus shown in FIG. 4 will be described with reference to FIG. 5. The output of the fundamental wave oscillator 6 takes a rectangular wave with the first frequency 2f, see FIG. 5, line A.

The frequency divider 7 frequency-divides the output of the oscillator 6 to produce rectangular wave rate pulses RP as shown in FIG. 5, line B. The rate pulse RP is transferred to the ultrasonic wave transducer for determining the ultrasonic wave generating rate, and also to the first sweeping signal generator 14. Accordingly, the CRT 4 is swept in Y direction with the period of the rate pulse RP. The sawtooth wave generator 8 generates a sawtooth waves TS as shown in FIG. 5, line C and two sawtooth waves, $TS_1$ and $TS_2$ are generated during one period of the rate pulse RP. The sawtooth wave TS and the reference signal RS, shown in FIG. 5, line D are compared in the comparator to form a $PW_2$ signal as shown in FIG. 5, line E. The $PW_2$ signal is comprised of PWM pulses, each pulse rising at the cross point of the rise position of the sawtooth wave TS and the reference signal RS and falling at the cross point of the falling position of the sawtooth wave TS and the reference signal RS. The first wave shaping monostable multivibrator circuit 2 produces a $PM_2$ signal, shown in FIG. 5, line F, comprising PPM, pulses each rising at the leading edge of each pulse of the $PW_2$ signal and having a very narrow pulse width. The PPM pulses of the signal $PM_2$ are successively numbered m, (m+1), (m+2), ..., with m assigned for the basic pulse. With respect to the sawtooth wave $TS_1$, the distance between the rise time point of the sawtooth wave and the PPM pulse (m+1) includes the sampling information taken when the reference signal RS is sampled by the sawtooth wave signal $TS_1$. The gate circuit 9 divides the PPM pulses m, m+1, m+2, ... into two groups; one is a first pulse train $P_1$ consisting of (m+1), (m+3), (m+5), ... (FIG. 5, line G) and the other a second pulse train $P_2$ consisting of m, (m+2), (m+4), (FIG. 5, line H) ... The delay monostable multivibrator circuit 10 produces rectangular waves (FIG. 5, line I) every time it receives each PPM pulse of the first pulse train $P_1$. Each rectangular wave rises synchronously with the input PPM pulse and has a pulse width corresponding to one period of the output frequency of the fundamental wave oscillator 6, i.e. one period of the sawtooth wave TS. The second wave shaping monostable multivibrator circuit 11 produces PPM pulses (FIG. 5, line J) each being synchronous with the falling time of the rectangular wave (FIG. 5, line I) and having a very narrow pulse width. The PPM pulses included in the first pulse train $P_1$ are inclusively designated by $P'_1$ and those of the second pulse train $P_2$ by $P'_2$. The PPM pulses $P'_1$ shown in FIG. 5, line J correspond to those of FIG. 5, line G delayed by one period of the sawtooth wave TS. Therefore, it may be considered that the FIG. 5, line j pulses include the sampling information of the reference signal RS included in the FIG. 5, line G, PPM pulses $P'_1$. The first pulse train $P'_1$ shown in FIG. 5, line J and the second pulse train $P'_2$ in FIG. 5, line H, are added in the first adder 12 to produce a pulse train shown in FIG. 5, line K. As seen from the figure, during one period of the RP rate pulse, two PPM pulses $P'_1$ and $P'_2$ are included in the period of the second sawtooth wave $TS_2$. The third wave shaping monostable multivibrator circuit 13 is used to obtain the PPM signal $PM_3$ for displaying the reference signal, through wave shaping the output pulses from the first adder 12 so as to have very narrow pulse widths and uniform crest values. The echo signal ES and the PPM signal $PM_3$ are added in the second adder 3 to produce a Z signal $ZS_3$ of FIG. 5, line L. When the Z input signal $ZS_3$ is applied to the CRT, the echo signal ES and the pulses $P'_1$ and $P'_2$ for reference signal display are displayed as shown by 102 and 103, respectively, see FIG. 6. Reference numeral 101 designates Y directional scanning lines of which the scanning period is equal to that of the rate pulse RP. Two points 103 on each scanning line 101 represent PPM pulses $P'_1$ and $P'_2$. The echo signal ES 102 also is visualized on each scanning line 101. The echo signal includes generally an initial echo signal and the succeeding echo signal. In the M-mode display, the sweeping rate in the X-axial direction ranges 1 to 10 seconds per one frame, as described above, and the frequency of the ultrasonic wave rate pulse RP is selected several KHz. Therefore, the reference signal may be displayed with a sufficient accuracy in practical use. Even if the reference signal includes high frequency components, for example, a phonocardiogram, two points of PPM pulses are displayed on a scanning line so that the phonocardiogram may be displayed accurately enough to satisfy practical requirements. When the reference signal has a low frequency and the amplitude difference of the reference signal between two sampling time points is small, two input signals to the first adder 12 are superposed and therefore wide width pulses are produced from the adder 12. Accordingly, there is a possibility that the display spot of the reference signal on the display would become excessively large or long due to addition of two amplitudes of two input signals. Such a phenomena may be prevented by using the third wave shaping monostable multivibrator circuit 13.

In the embodiment mentioned above, the reference signal is sampled by the frequency two times that of the rate pulse RP. N times frequency of that may also be used for sampling it. Here, n is an integer and equal to or more than 2. In this case, n sawtooth waves TS (FIG. 5, line C) are generated during one period of the rate pulse RP (FIG. 5, line B), and the reference signal RS is sample n times. Thus obtained PPM pulses further are applied to the gate circuit 9 where they are converted into n pulse trains to position n PPM pulses during one period of one sawtooth wave included in the rate pulse RP. In this case, the reference signal is displayed by n display dots lying on a scanning line 101.

Referring now to FIG. 7, there is shown a circuit diagram of the gate circuit 9. As shown, the gate circuit 9 includes a flip-flop circuit (FF) $IC_1$, a gate $IC_2$, an inverter $IC_3$, a gate $IC_4$ and an inverter $IC_5$. The PPM pulse train $PM_2$ (FIG. 5, line E) is applied to one of the inputs of each gate $IC_2$ and $IC_4$. The output signal with the frequency 2f from the fundamental frequency oscillator 6 is applied to the clock terminal of the FF circuit $IC_1$ which produces the outputs Q and $\overline{Q}$. The outputs Q and $\overline{Q}$ are applied as control signals to the other inputs of the gates $IC_2$ and $IC_4$, respectively. The output of the gate $IC_2$ produces through the inverter $IC_3$ a 1st pulse train $P_1$ (FIG. 5, line G) and the output of the gate $IC_4$ produces through an inverter $IC_5$ a 2nd pulse train $P_2$ (FIG. 5, line H). The delay monostable multivibrator circuit 10 includes gates $IC_6$ and $IC_7$, capacitors $C_1$ and $C_2$, and resistors $R_1$ to $R_3$ with connections as shown. The first pulse train $P_1$ is coupled with one of the terminals of the capacitor $C_1$, as shown. The capacity and resistance of the time constant circuit including the capacitor $C_2$ and the resistor $R_3$ are selected to have given values. Such a selection causes the monostable multivibrator 10 to produce the rectangular wave (FIG. 5, line I) with time width T satisfying the relation $T=1/f$. The 2nd shaping monomulticircuit 11 comprises gates $IC_8$ and $IC_9$, capacitors $C_3$ and $C_4$, and resistors $R_4$, $R_5$ and $R_6$, with connections as shown. The rectangular wave output is coupled with one of the terminals of the capacitor $C_3$. The monomulticircuit 11 produces the pulse train (FIG. 5, line J) in synchronously with the trailing edge of the rectangular wave signal. The respective pulses of the pulse train (FIG. 5, line I) outputted from the circuit 11 are delayed by $T=1/f$ with respect to the respective pulses of the 1st pulse train (FIG. 5, line G). The pulse width of the delayed pulse is narrowed satisfactorily by proper selection of the time constant of the time constant circuit including the capacitor $C_4$ and the resistor $R_6$. The first adder 12 is a digital adder and includes an inverter $IC_{10}$ for receiving the output of the monostable multivibrator circuit 11, an inverter $IC_{11}$ for directly receiving the pulse train $P_2$, and a gate $IC_{12}$ for feeding an output (FIG. 5, line K) to a third shaping monostable multivibrator circuit 13 after receiving the outputs of the inverters $IC_{10}$ and $IC_{11}$.

What is claimed is:

1. An ultrasonic diagnostic apparatus for examining an object by concurrently displaying an M-mode ultrasonic echo signal and a representation of a reference signal comprising:

means for generating a fundamental pulse having a first frequency, means coupled with said generating means for converting said fundamental pulse into a rate pulse having a second frequency 1/n times said first frequency, n being an integer $\geq 2$, an ultrasonic wave transducer coupled with said converting means and driven by said rate pulse to emit ultrasonic waves through the object at a rate equal to said second frequency, means for detecting the reflected portions of the ultrasonic waves and forming an echo signal, means coupled with the reference signal for pulse-position-modulating said reference signal in response to said fundamental pulse to produce n pulse-position-modulated pulses during the period of each rate pulse, means coupled with said modulating means for rearranging said n pulse-position-modulated pulses produced during a period of each rate pulse to fit within only a predetermined portion of each rate pulse, means coupled with said detecting means and said rearranging means for combining the rearranged pulse-position-modulated pulses of said reference signal and said echo signal to form a combined signal, means for generating a first sweep signal having the same frequency and being synchronous with said rate pulse, means for generating a second sweep signal having a selected third frequency, and display means coupled with said combining means, first sweep signal generating means and second sweep signal generating means for receiving and processing said combined signal, said first sweep signal and said second sweep signal to concurrently display a M-mode ultrasonic echo signal and the pulse-position-modulated pulses representing said reference signal.

2. The ultrasonic diagnostic apparatus of claim 1 wherein said generating means comprises an oscillator and said display means comprises a cathode ray tube.

3. An ultrasonic wave diagnostic apparatus for examining an object by concurrently displaying an M-mode ultrasonic wave echo signal and a representation of a reference signal, comprising:

an oscillator for producing a pulse signal having a first frequency, means coupled with said oscillator for producing rate pulses having a second frequency equal to half of the first frequency, an ultrasonic wave transducer coupled with said rate pulse producing means and driven by said rate pulse to emit ultrasonic waves through the object at a rate equal to the second frequency, means for detecting the reflected portions of the ultrasonic waves and forming an echo signal, a saw-tooth wave generating circuit coupled with said oscillator for generating, during one period of said rate pulse, two sawtooth waves having a frequency equal to said first frequency, means coupled with said reference signal and said sawtooth generating circuit for modulating said reference signal by said sawtooth waves to produce two pulse-position-modulated (PPM) pulses during the period of each rate pulse, means coupled with said modulating means for rearranging said two PPM pulses produced in the period of each rate pulse to fit within the period defined by a selected one of said two sawtooth waves, means coupled with said detecting means and said rearranging means for adding said ultrasonic echo signal and said rearranged PPM pulses to form an added signal, means for generating a first sweep signal having the same frequency, and being synchronous, with said rate pulse, a low frequency sweep signal generating circuit for supplying a second sweeping signal having a frequency lower than said rate pulse and display means coupled with said adding means, said first sweep signal generating means and said second sweep signal means for receiving and processing said added signal, said first sweep signal, and said second sweep signal to concurrently display an M-mode ultrasonic echo signal and the pulse-position-modulated pulses representing said reference signal.

4. The ultrasonic wave diagnostic apparatus according to claim 3 wherein said modulating means includes a comparing circuit for comparing said sawtooth waves with said reference signal to produce pulse-width-modulated (PWM) signals and a first monostable multivibrator for wave shaping the PWM signals to form PPM pulses.

5. The ultrasonic diagnostic apparatus of claim 4 wherein said comparing circuit produces a series of PWM pulses, each pulse rising at the cross point of the rise position of a respective sawtooth wave and the reference signal and falling at the cross point of the falling position of the respective sawtooth wave and the reference signal.

6. The ultrasonic diagnostic apparatus of claim 4 wherein said first monostable multivibrator forms a series of PPM pulses, each pulse rising at the leading edge of each pulse produced by said comparing circuit and having a very narrow pulse width.

7. The ultrasonic wave diagnostic apparatus according to claim 4 wherein said rearranging means includes:

a gate circuit coupled with the first monostable multivibrator to divide said PPM pulses into two pulse trains, the first pulse train comprising the PPM pulses corresponding to the first sawtooth wave generated during one rate pulse and the second pulse train comprising the PPM pulses corresponding to the second sawtooth wave generated during the same one rate pulse, said gate circuit having a first train output and a second train output, a delay circuit, coupled with said first train output for delaying the respective first PPM pulse train by one period of said first frequency, and a first adder circuit coupled with said delay circuit and said second train output for adding the delayed first PPM pulse train and the second PPM pulse train.

8. The ultrasonic diagnostic apparatus of claim 7 wherein said delay circuit comprises a delay monostable multivibrator which produces rectangular waves, having a pulse width equal to one period of the first frequency, every time it receives a PPM pulse from said first train output.

9. The ultrasonic diagnostic apparatus of claim 8 further comprising a second monostable multivibrator coupled between said delay monostable multivibrator and said first adder circuit for shaping the output of the delay monostable multivibrator to produce PPM pulses each of which is synchronous with the falling time of the rectangular wave and has a narrow pulse width.

10. The ultrasonic diagnostic apparatus of claim 7 further comprising a monostable multivibrator coupled between said first adder circuit and said adding means to shape the output of said first adding means to form pulses of narrow pulse width and uniform crest value.

11. The ultrasonic diagnostic apparatus of claim 10 wherein said adding means comprises a second adder circuit and said display means comprises a cathode ray tube.

12. The ultrasonic diagnostic apparatus of claim 3 wherein said second sweep signal causes the output beam of the cathode ray tube to sweep in the X direction within the range of 1 to 10 seconds per frame and the first sweep signal has a frequency within the range of 1 to 2 KHz and causes the beam of the cathode ray tube to make one sweep in the Y direction during each period of the second frequency.

* * * * *